July 21, 1964  F. M. BAIRD  3,141,644
TRASH CAN HOLDER
Filed May 25, 1962  2 Sheets-Sheet 1
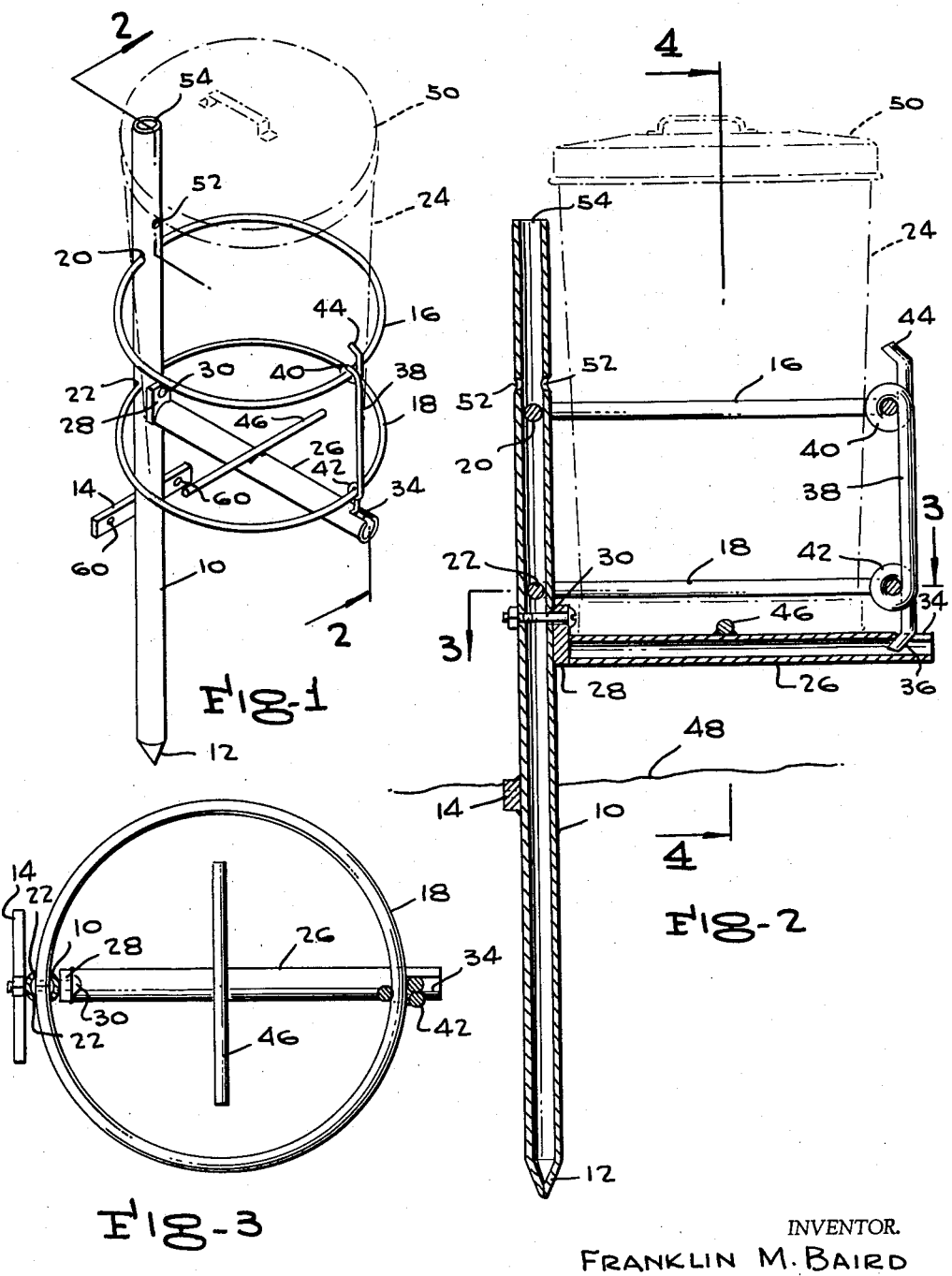
INVENTOR.
FRANKLIN M. BAIRD
BY
McMorrow, Berman & Davidson
ATTORNEYS July 21, 1964  F. M. BAIRD  3,141,644
TRASH CAN HOLDER
Filed May 25, 1962  2 Sheets-Sheet 2
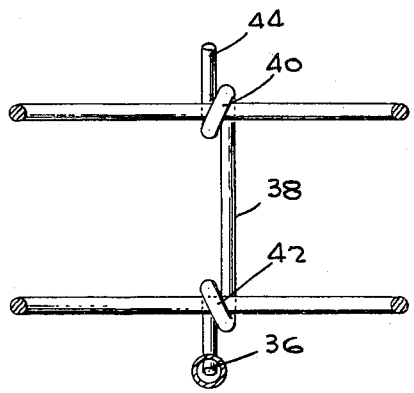
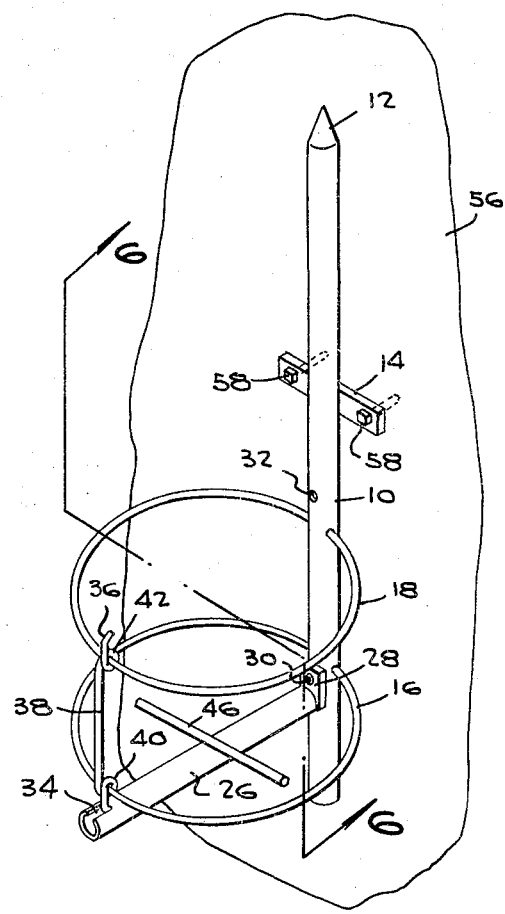
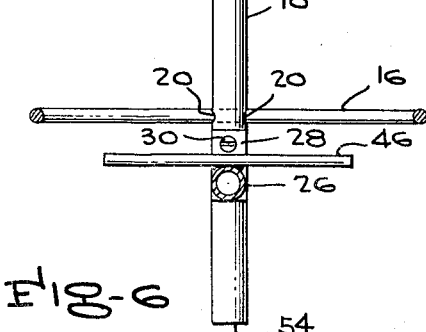
INVENTOR.
FRANKLIN M. BAIRD
BY
McMorrow, Berman & Davidson
ATTORNEYS

United States Patent Office 3,141,644
Patented July 21, 1964

3,141,644
TRASH CAN HOLDER
Franklin M. Baird, 40 Vernon St., Uniontown, Pa.
Filed May 25, 1962, Ser. No. 197,671
7 Claims. (Cl. 248—146)

This invention relates to a holder for trash cans or the like. Although these receptacles are a basic necessity in respect to the hygienic demands of modern living, their use is attended with numerous difficulties, chief among which is their well-recognized vulnerability to overturning, whether by accident, as in the case of unruly weather, or by design, as in the case of marauding animals, or vandalous or mischievous children. By the present invention I have contrived to overcome these difficulties in satisfactory measure by providing a holding framework, which not only protects the receptacle against overturning, but permits its retention in an elevated position, above the ground.

It is therefore a general object of the invention to provide a holder for refuse cans and the like, which is proof against overturning. Another object is to provide a device which supports the receptacle above the ground level. Yet another object is to provide a holder which is installed by the simple act of driving a single, supporting leg into the ground, and a related object is to provide a holder which is reversible, for attachment to a suitable structure, when driving into the ground is impractical, or inadvisable for any reason.

Other objects include the accommodation of receptacles in a range of sizes, and the attainment of simplicity of structure without sacrifice to durability, as well as the provision of a device which is low in cost, and easy of manufacture.

These and other ends, which will be apparent, are attained by the present invention, a preferred form of which is described in the following specification, as illustrated in the drawings, in which:

FIGURE 1 is a perspective view of the holder, in position for staking in the ground, FIGURE 2 is a sectional view on a vertical mid-plane of symmetry through the device, taken on the line 2—2 of FIGURE 1, FIGURE 3 is a sectional view on a horizontal plane, taken on the line 3—3 of FIGURE 2, FIGURE 4 is a sectional view, taken on the line 4—4 of FIGURE 2, FIGURE 5 is a perspective view, showing the holder of FIGURE 1, as inverted, for attachment to a structure above ground, and FIGURE 6 is a sectional view taken on the line 6—6 of FIGURE 5.

Referring to the drawings by characters of reference, there is shown a holder assembly comprising an upright or standard 10, of tubular construction, which may be described as the backbone of the device, the lower end 12 of which is pointed, as by slitting, trimming and bending to cone shape, for ready penetration into the ground. Since this single, supporting member will be subject to appreciable torque, due to the offset basket structure it supports, provision is made against turning by means of a transversely disposed bar 14, welded to the tube 10 at a position therein which will permit of its penetration into the ground, at least to a small extent, when the tube 10 is driven in, thus providing a substantial resistance to turning.

Cooperating with the upright, or backbone 10, is a rib structure comprising a pair of rings 16, 18, passing through suitable, diametrically opposite openings 20, 22, in the upright, on axes transverse thereto. These rings, which are fabricated from round rod, and which may be end-sealed into closed, ring form after threading through the openings in tube 10, form side support for a refuse can, such as the can 24 shown in dash lines in FIGURES 1 and 2.

Bottom support for the can is provided in a transversely extending, tubular member 26, having a lug 28 welded across one end, and extending outwardly of the tube, by means of which it is secured to upright 10 by a bolt 30, passing through bores 32 in tube 10. At its outer end, horizontal tube 26 has a slot 34 on its upper side, receiving the inwardly hooked, lower end portion 36 of a vertical tie rod 38, engaging the respective rings 16, 18, in looped portions 40, 42. At its upper end, the rod 38 also has an inwardly bent section 44, for use in a manner similar to that of hook section 36, when the holder is inverted for the alternative position of use. For retaining cans of smaller size, the bottom member 26 is provided with a centrally located, transversely extending rod 46, which may be secured as by welding.

In the case where ground anchorage is available and practicable, the tube 10 is merely driven vertically into the ground until cross bar 14 has penetrated to some extent and the holder is ready for use in the form shown in FIGURE 2, where the ground level is indicated by the numeral 48. In this arrangement the tube 10 is rigidly vertical, and is held against turning by the resistance of bar 14. In addition, the bottom member 26 is at an elevated position above the ground, which not only removes the can cover 50 from the reach of animals and small children, but also retains the can bottom out of ground contact, with attendant benefits from a hygienic standpoint, as well as avoidance of corrosive action. The ribs 16, 18, of course, retain the can effectively against overturning.

In the case where staking in the ground is not possible or practicable, the holder may be secured to a structure located above ground. This is accomplished by turning the holder end for end, so that the pointed end 12 is uppermost, and relocating the bottom support 26. To accomplish the latter, the bolt 30 is removed, and tube 26 lifted from its connection with hooked end 36 of rod 38, and the plate 28 secured by bolt 30 in an alternative set of bores 52 between the ring 16 and the square end 54 of tube 10. With the holder thus inverted, the assembly may be secured to a structure, such as the surface 56 shown in FIGURES 5 and 6, by means of screws 58, passed through suitable bores 60 in the turn-resisting bar 14.

While a certain preferred embodiment has been shown and described, various modifications will be apparent, in the light of this disclosure, and the invention should not, therefore, be deemed as limited, except insofar as shall appear from the spirit and scope of the appended claims.

I claim:
1. A holder for trash cans and the like comprising an upright having a pointed end, two pairs of axially aligned transverse bores at spaced positions intermediately of the length of the upright, a ring threaded through each of said pairs of bores and concentric about a common cylindrical axis, said upright also having two pairs of axially aligned transverse bores on opposite sides of said rings, and disposed perpendicularly to the first-mentioned bores, a bottom-support member having a transversely disposed end plate bolted to one of the second-mentioned pairs of bores, and an end slot in its outer end edge, a rod secured to said bottom-support member, medially thereof and arranged transversely thereto, a tie rod having looped portions engaging the respective said rings and having hooked end portions beyond said rings, one of said end portions engaging in said slot in said bottom-support member, and a transverse plate secured to said upright be- tween said pointed end and the nearmost of the second-mentioned pairs of bores.

2. A holder for trash cans and the like comprising an upright having a pointed end, two pairs of axially aligned transverse bores at spaced positions intermediately of the length of the upright, a ring threaded through each of said pairs of bores and concentric about a common cylindrical axis, said upright also having two pairs of axially aligned transverse bores on opposite sides of said rings, and disposed perpendicularly to the first-mentioned bores, a bottom-support member having a transversely disposed end plate bolted to one of the second-mentioned pairs of bores, and an end slot in its outer end edge, a tie rod connecting the respective said rings and having hooked end portions beyond said rings, one of said end portions engaging in said slot in said bottom-support member, and a transverse plate secured to said upright between said pointed end and the nearmost of the second-mentioned pairs of bores.

3. A holder for trash cans and the like comprising a standard with one end tapered, a pair of rings secured to said standard at spaced positions, and centered on a common, cylindrical axis, a tie rod connecting said rings at a position remote from said standard, a bottom-support member for cans, and having a cross member intermediate its length, means to attach one end of said support member, alternatively at positions on said standard on opposite sides of said rings, and a laterally disposed bar secured to said standard between the tapered end thereof and the nearmost of said positions.

4. A holder for trash cans and the like comprising a stindard with one end tapered, a pair of rings secured to said standard at spaced positions, and arranged in parallel planes, perpendicular to the length of the upright, a tie rod connecting said rings at a position remote from said standard, a bottom-support member for cans, and having a cross member intermediate its length, means to attach one end of said support member, alternatively at positions on said standard on opposite sides of said rings, and a laterally disposed bar secured to said standard between the tapered end thereof and the nearmost of said positions.

5. A holder for trash cans and the like comprising a standard with one end tapered, a pair of rings secured to said standard at spaced positions, and arranged in parallel planes, perpendicular to the length of the upright, a tie rod connecting said rings at a position remote from said standard, a bottom-support member for cans, means to attach one end of said support member, alternatively at positions on said standard on opposite sides of said rings, and a laterally disposed bar secured to said standard between the tapered end thereof and the nearmost of said positions.

6. A device as in claim 5, said bottom-support member having a slot at its outer end, and said tie rod having hooked ends adapted to engage in said slot.

7. A holder for trash cans and the like comprising a standard with one end tapered, a pair of rings secured to said standard at spaced positions, and arranged in parallel planes, perpendicular to the length of the upright, a bottom-support member for cans, means to attach one end of said support member, alternatively at positions on said standard on opposite sides of said rings, and a laterally disposed bar secured to said standard between the tapered end thereof and the nearmost of said positions.

References Cited in the file of this patent
UNITED STATES PATENTS

| | | |
|---|---|---|
| 764,472 | Kessler | July 5, 1904 |
| 2,430,672 | Gandrud | Nov. 11, 1947 |
| 2,673,053 | Kilian | Mar. 23, 1954 |
| 2,732,155 | Stanley | Jan. 24, 1956 |